(12) United States Patent
Anthony et al.

(10) Patent No.: US 11,981,352 B2
(45) Date of Patent: May 14, 2024

(54) SYSTEM AND METHOD OF PREDICTING HUMAN INTERACTION WITH VEHICLES

(71) Applicant: Perceptive Automata, Inc., Boston, MA (US)

(72) Inventors: Samuel English Anthony, Cambridge, MA (US); Kshitij Misra, Cambridge, MA (US); Avery Wagner Faller, Cambridge, MA (US)

(73) Assignee: Perceptive Automata, Inc., Cambridge, MA (US)

( * ) Notice: Subject to any disclaimer, the term of this patent is extended or adjusted under 35 U.S.C. 154(b) by 593 days.

(21) Appl. No.: 17/190,631

(22) Filed: Mar. 3, 2021

(65) Prior Publication Data

US 2021/0182605 A1   Jun. 17, 2021

Related U.S. Application Data

(63) Continuation-in-part of application No. 16/828,823, filed on Mar. 24, 2020, now Pat. No. 11,126,889,
(Continued)

(51) Int. Cl.
*G06N 3/04* (2023.01)
*B60W 30/00* (2006.01)
(Continued)

(52) U.S. Cl.
CPC ...... *B60W 60/00274* (2020.02); *B60W 30/00* (2013.01); *G05D 1/0088* (2013.01);
(Continued)

(58) Field of Classification Search
CPC ............ B60W 60/00274; B60W 30/00; G05D 1/0088; G05D 2201/0213; G06F 18/214;
(Continued)

(56) References Cited

U.S. PATENT DOCUMENTS

| 7,269,516 B2 | 9/2007 | Brunner et al. |
| 8,175,333 B2 | 5/2012 | Eaton et al. |
| (Continued) | | |

FOREIGN PATENT DOCUMENTS

| CN | 105530061 A | 4/2016 |
| KR | 10-2015-0076627 A | 7/2015 |
| KR | 10-2015-0108817 A | 9/2015 |

OTHER PUBLICATIONS

Girdhar, R. and Ramanan, D., "Attentional Pooling for Action Recognition," 31st Conference on Neural Information Processing Systems (NIPS 2017), 12 pages.
(Continued)

*Primary Examiner* — Charlotte M Baker
(74) *Attorney, Agent, or Firm* — Fenwick & West LLP

(57) ABSTRACT

Systems and methods for predicting user interaction with vehicles. A computing device receives an image and a video segment of a road scene, the first at least one of an image and a video segment being taken from a perspective of a participant in the road scene and then generates stimulus data based on the image and the video segment. Stimulus data is transmitted to a user interface and response data is received, which includes at least one of an action and a likelihood of the action corresponding to another participant in the road scene. The computing device aggregates a subset of the plurality of response data to form statistical data and a model is created based on the statistical data. The model is applied to another image or video segment and a prediction of user behavior in the another image or video segment is generated.

20 Claims, 11 Drawing Sheets

Related U.S. Application Data which is a continuation of application No. 16/512,560, filed on Jul. 16, 2019, now Pat. No. 10,614,344, which is a continuation of application No. 15/830,549, filed on Dec. 4, 2017, now Pat. No. 10,402,687.

(60) Provisional application No. 62/528,771, filed on Jul. 5, 2017.

(51) Int. Cl.
| | |
|---|---|
| B60W 60/00 | (2020.01) |
| G05D 1/00 | (2006.01) |
| G06F 18/214 | (2023.01) |
| G06F 18/40 | (2023.01) |
| G06N 3/08 | (2023.01) |
| G06N 3/084 | (2023.01) |
| G06V 10/778 | (2022.01) |
| G06V 20/40 | (2022.01) |
| G06V 20/58 | (2022.01) |
| G06V 40/20 | (2022.01) |
| G08G 1/04 | (2006.01) |
| G08G 1/16 | (2006.01) |
| G06N 5/01 | (2023.01) |
| G06N 20/10 | (2019.01) |

(52) U.S. Cl.
CPC ............ *G06F 18/214* (2023.01); *G06F 18/41* (2023.01); *G06N 3/04* (2013.01); *G06N 3/08* (2013.01); *G06N 3/084* (2013.01); *G06V 10/7784* (2022.01); *G06V 20/41* (2022.01); *G06V 20/58* (2022.01); *G06V 40/20* (2022.01); *G08G 1/04* (2013.01); *G08G 1/166* (2013.01); *G05D 2201/0213* (2013.01); *G06N 5/01* (2023.01); *G06N 20/10* (2019.01)

(58) Field of Classification Search
CPC . G06F 18/41; G06N 3/04; G06N 3/08; G06N 3/084; G06N 5/01; G06N 20/10; G06V 10/7784; G06V 20/41; G06V 20/58; G06V 40/20; G08G 1/04; G08G 1/166; G08G 1/012; G08G 1/0133; G08G 1/0141; G08G 1/164; G08G 1/0112; G08G 1/0129
USPC .......................................................... 382/104
See application file for complete search history.

(56) References Cited

U.S. PATENT DOCUMENTS

| | | | |
|---|---|---|---|
| 8,854,457 | B2 | 10/2014 | De Vleeschouwer et al. |
| 9,096,128 | B2 | 8/2015 | Shaw et al. |
| 9,245,205 | B1 * | 1/2016 | Soldevila ............. G06V 10/464 |
| 9,485,474 | B2 | 11/2016 | Kim et al. |
| 9,881,221 | B2 | 1/2018 | Bala et al. |
| 10,186,123 | B2 | 1/2019 | Kanaujia et al. |
| 2011/0133917 | A1 | 6/2011 | Zeng |
| 2015/0213555 | A1 | 7/2015 | Barfield, Jr. et al. |
| 2016/0042621 | A1 | 2/2016 | Hogg et al. |
| 2017/0153639 | A1 | 6/2017 | Stein |
| 2017/0270374 | A1 | 9/2017 | Myers et al. |
| 2018/0047071 | A1 * | 2/2018 | Hsu ..................... G06Q 30/0282 |
| 2018/0146198 | A1 | 5/2018 | Atluru et al. |
| 2019/0079526 | A1 | 3/2019 | Vallespi-Gonzalez et al. |

OTHER PUBLICATIONS

He, K. et al., "Mask R-CNN," Computer Vision and Pattern Recognition 1703.06870v3, Jan. 24, 2018, 12 pages.
International Search Report and Written Opinion, PCT Application No. PCT/US2018/063459, dated Feb. 7, 2019, 13 pages.
Karmarkar, T., "Regional Proposal network (RPN)-Backbone of Faster R-CNN," Aug. 18, 2018, 6 pages, [Online][Retrieved Jan. 5, 2019], Retrieved from the internet <URL:https://medium.com/@tanaykarmarkar/region-proposal-network-rpn-bac>.
Kotseruba, I., et al., Joint Attention in Autonomous Driving (JADD), Robotics 1609.04741v5, Apr. 24, 2017, 10 pages.
Newell, A., et al., "Stacked Hourglass Networks for Human Pose Estimation," Computer Vision and Pattern Recognition 1603.06937v2, Jul. 26, 2016, 17 pages.
Ren, S. et al., "Faster R-CNN: Towards Real-Time Object Detection with Region Proposal Networks," Advances in Neural Information Processing Systems 28 (NIPS 2015), 9 pages.
Ren, S. et al., "Faster R-CNN: Towards Real-Time Object Detection with Region Proposal Networks," Computer Vision and Pattern Recognition 1506.01497v3, Jan. 6, 2016, 14 pages.
Santoro, A. et al., "A neural approach to relational reasoning," Jun. 6, 2017, 6 pages, [Online][Retrieved Jan. 5, 2019], Retrieved from the internet <URL:https://deepmind.com/blog/neural-approach-relational-reasoning/>.
Santoro, A. et al., "A simple neural network module for relational reasoning," Computation and Language 1706.01427, Jun. 5, 2017, 16 pages.
Schneemann, F., et al., "Context-based Detection of Pedestrian Crossing Intention for Autonomous Driving in Urban Environments," 2016 IEEE/RSJ International Conference on Intelligent Robots and Systems (IROS), Oct. 2016, 6 pages.
Watters, N., et al., "Visual Interaction Networks," Computer Vision and Pattern Recognition 1706.01433v1, Jun. 5, 2017, 14 pages.
Zhao, H., et al., "Pyramid Scheme Parsing Network," Computer Vision and Pattern Recognition 1612.01105v2, Apr. 27, 2017, 11 pages.
United States Office Action, U.S. Appl. No. 16/512,560, dated Aug. 16, 2019, 11 pages.
Extended European Search Report, European Patent Office Application No. 18885768.4, dated Jun. 28, 2021, eight pages.
United States Office Action, U.S. Appl. No. 16/828,823, dated Feb. 26, 2021, 10 pages.
First Office Action, China National Intellectual Property Administration Patent Application No. 201880085140.X, dated Mar. 8, 2023, 33 pages.
Tomar, R.S., et al., "Neural network based lane change trajectory predictions for collision prevention," *2011 International Conference on Computational Intelligence and Communication Networks*, Gwalior, India, 2011, pp. 559-564, doi: 10.1109/CICN.2011.120.
Wanfang Data, English summary and abstract of Zhang et al., "Decision Model for Vehicle Lane Changing Based on Support Vector Machine," Journal of Wuhan University of Technology (Transportation Science & Engineering), Oct. 5, 2017, pp. 849-853, 3 pages [Online] [Retrieved on Apr. 11, 2023] Retrieved from the Internet <URL:https://d.wanfangdata.com.cn/print?type=UGVyaW9kaWNhbA%3D%3D&resourceId=d2hqdGtqZHh4YjlwMTcwNTAyNw%3D%3D&transaction=undefined>.
Korean Office Action, Korean Intellectual Property Office Patent Application No. 10-2020-7019291, dated Oct. 24, 2023, 17 pages.

* cited by examiner

| 600 | 602 | 604 | 606 |
|---|---|---|---|
| subject_id | derived_stim | response | response_time |
| 2329 | /ims/seg114/vid44m22s23-28 | 3 | 440 |
| 2329 | /ims/seg3932/vid329m24s01-16 | 1 | 600 |
| 2330 | /ims/seg114/vid44m22s23-28 | 1 | 280 |
| 2330 | /ims/seg118/vid51m02s44-50 | 4 | 500 |

FIG. 6

SYSTEM AND METHOD OF PREDICTING HUMAN INTERACTION WITH VEHICLES

CROSS REFERENCE TO RELATED APPLICATIONS

This application is a continuation-in-part of U.S. patent application Ser. No. 16/828,823, filed on Mar. 24, 2020, which is a continuation of U.S. patent application Ser. No. 16/512,560, filed on Jul. 16, 2019, now U.S. Pat. No. 10,614,344, issued on Apr. 7, 2020, which is a continuation of U.S. patent application Ser. No. 15/830,549, filed on Dec. 4, 2017, now U.S. Pat. No. 10,402,687, issued on Sep. 3, 2019, which claims priority under 35 U.S.C. § 119(e) to U.S. Provisional Application No. 62/528,771, filed Jul. 5, 2017, the contents of each of which are incorporated by reference herein.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally to data analytics, and in particular, to predicting human interactions with various moveable devices such as vehicles and to predicting behavior of crowds.

BACKGROUND

The ability of an operator of a moveable device (e.g., vehicle, hospitality robot, security robot, delivery robot, construction equipment, drone, manufacturing equipment) to look at a person in the vicinity and predict what that person wants to do is an important part of operating the moveable device. For example, when a driver of a car sees people near the car, determining whether one person will cross the street, whether another person will remain standing on a street corner, and whether yet another person will change lanes on his or her bicycle is necessary to safely drive the car and avoid hitting the people.

Fortunately, human operators have a natural ability to predict a person's behavior. However, computers and autonomous robots cannot adequately predict the behavior of people. For example, autonomous driving vehicles may rely on methods that make decisions on how to control the vehicles by predicting "motion vectors" of people near the vehicles. This is accomplished by collecting data of a person's current and past movements, determining a motion vector of the person at a current time based on these movements, and extrapolating a future motion vector representing the person's predicted motion at a future time based on the current motion vector. However, the methods do not predict a person's actions or movements based on other observations besides the person's current and past movements, which lead to inferior results in predicting the person's future behavior.

SUMMARY OF THE INVENTION

Systems and methods for predicting user interaction with vehicles enabling motorists, cyclists, and pedestrians to anticipate the actions of other motorists, cyclists, and pedestrians. In some embodiments, a computing device receives a first at least one of an image and a video segment of a road scene, the first at least one of an image and a video segment being taken from a perspective of a participant in the road scene, the first at least one of an image and a video segment including at least one of a pedestrian, a cyclist, and a motor vehicle. In some embodiments, the computing device generates stimulus data based on the first at least one of the image and the video segment, the stimulus data comprising at least one of the first at least one of the image and the video segment, and an altered version of the first at least one of the image and the video segment. In some embodiments, the computing device transmits the stimulus data to a user interface. In some embodiments, the computing device receives a plurality of response data from the user interface, the response data including user inputted data by associated with the stimulus data, the user inputted data including at least one of an action and a likelihood of the action corresponding to at least one of the pedestrian, the cyclist, and the motor vehicle associated with the road scene. In some embodiments, the computing device aggregates a subset of the plurality of response data corresponding to one of the first at least one of the image and the video segment to form statistical data. In some embodiments, the computing device creates a model based on the statistical data and applies the model to a second at least one image or video segment. In some embodiments, the computing device generates a prediction of user behavior in the second at least one image or video segment based on the application of the model to the second at least one image or video segment.

In some embodiments, creating the model further comprises training a supervised learning algorithm, the supervised learning algorithm including at least one of a random forest regressor, a support vector regressor, a simple neural network, a deep convolutional neural network, a recurrent neural network, and a long-short-term memory (LSTM) neural network. In some embodiments, generating the stimulus data further comprises manipulating at least one of pixel data or array data associated with the first at least one of the image and the video segment and creating a manipulated data file including the manipulated at least one of pixel data or array data associated with the first at least one of the image and the video segment. In some embodiments, the manipulated data file includes a looped version of extracted frames from the first at least one of the image and the video segment. In some embodiments, the action includes one of the at least one of the pedestrian, the cyclist, and the motor vehicle staying in place, changing lanes, and crossing a street, and the likelihood of the action includes an ordinal value associated with a probability of the action. In some embodiments, the statistical data is associated with a parameter of the subset of the plurality of response data, the parameter including at least one of a content of a response, a time associated with entering a response, and a position of an eye of a human observer associated with the response, the position being measured with respect to a display associated with the user interface. The parameter is further associated with at least one of a central tendency, a variance, a skew, a kurtosis, a scale, and a histogram. In some embodiments, the second at least one image or video segment is associated with a live road scene. In some embodiments, the computing device further comprises receiving the second at least one image or video segment from another computing device associated with a vehicle participating in the live road scene. In some embodiments, the second at least one image or video segment is the same as the first at least one image or video segment and the computing device further compares the prediction of user behavior with the statistical data to generate an error signal and adjusts at least one weight associated with the model based on the error signal. In some embodiments, the at least one image or video segment monitors a group of people in an environment where large crowds may gather such as an airport, amusement park, a store, or streets. A prediction may be made to predict an attribute associated with the group of people and predict their behavior as a group. Based on the predicted behavior, an action for managing the group of people may be determined. In some embodiments, the at least one image or video segment is captured by a moveable device such as a delivery robot, a forklift, a factory arm, a low-flying drone, hospitality or security robot. The prediction of user behavior is used to control the moveable device.

These and other capabilities of the disclosed subject matter will be more fully understood after a review of the following figures, detailed description, and claims. It is to be understood that the phraseology and terminology employed herein are for the purpose of setting forth illustrative examples of the invention, and the description should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 6 shows a data structure associated with tracking video segment data, according to some embodiments of the present disclosure.

DETAILED DESCRIPTION

Systems and methods are described for judging the behavior of people near a vehicle in a way that more closely resembles how human drivers would judge the behavior. For example, in one embodiment, a group of users (or human observers) view sample images of people (such as pedestrians) near streets and/or vehicles and indicate or are measured for their understanding of how they believe the people will behave. These indicators or measurements are then used as a component for training an algorithm that predicts how people will behave in a real-world context. In other words, after being trained based on the reactions of human observers to sample images in a training environment, the algorithm is able predict actual pedestrian behavior in a real-world environment.

In a further implementation, human observers are presented with small samples of video data that have been modified to focus the observers on aspects of the samples most likely to be relevant to predicting pedestrian or other driver behavior, and to eliminate aspects which are not relevant to prediction such behavior. Large sets of observers are asked to score the samples of video data on a continuum, and the scored samples are collected. The overall collection of scores on the continuum comprises a distribution of "scores." The parameters of this distribution are then used to construct a target for the learning model of an algorithm for subsequently predicting pedestrian or driver behavior in a real-world environment.

Figure 1:
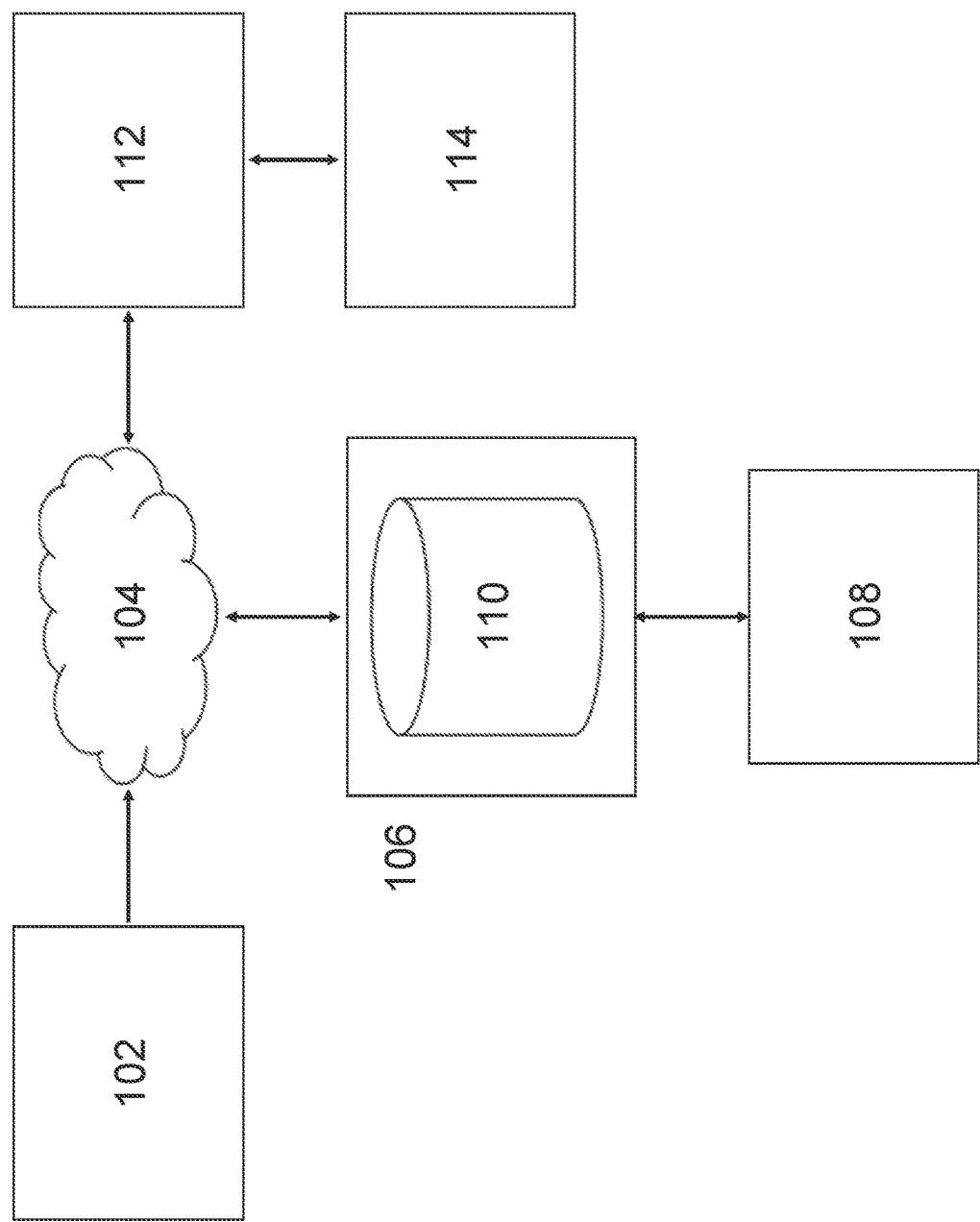
FIG. 1 is a system diagram of a networked system for predicting human behavior according to some embodiments of the present disclosure.

FIG. 1 is a system diagram of a networked system for predicting human behavior according to some embodiments of the present disclosure. FIG. 1 shows a vehicle 102, a network 104, a server 106, a user response database 110, a user terminal 108, a model training system 112 and a prediction engine 114.

The vehicle 102 can be any type of manual or motorized vehicle such as a car, bus, train, scooter, or bicycle. As described in more detail below, the vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114.

The server 106 can be any type of computer system capable of (1) hosting information (such as image, video and text information) and delivering it to a user terminal (such as user terminal 108), (2) recording responses of multiple users (or human observers) to the information, and (3) delivering such information and accompanying responses (such as responses input via user terminal 108) back to the network 104.

The user response database 110 can be any type of database or data storage system capable of storing the image, video, and text information and associated user responses and subsequently recalling them in response to a query.

The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

The prediction engine 114 can be implemented in any computing system. In an illustrative example, the engine 114 includes an algorithm that has been trained by the model training system 112. This trained algorithm is able to estimate a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

Figure 2A:
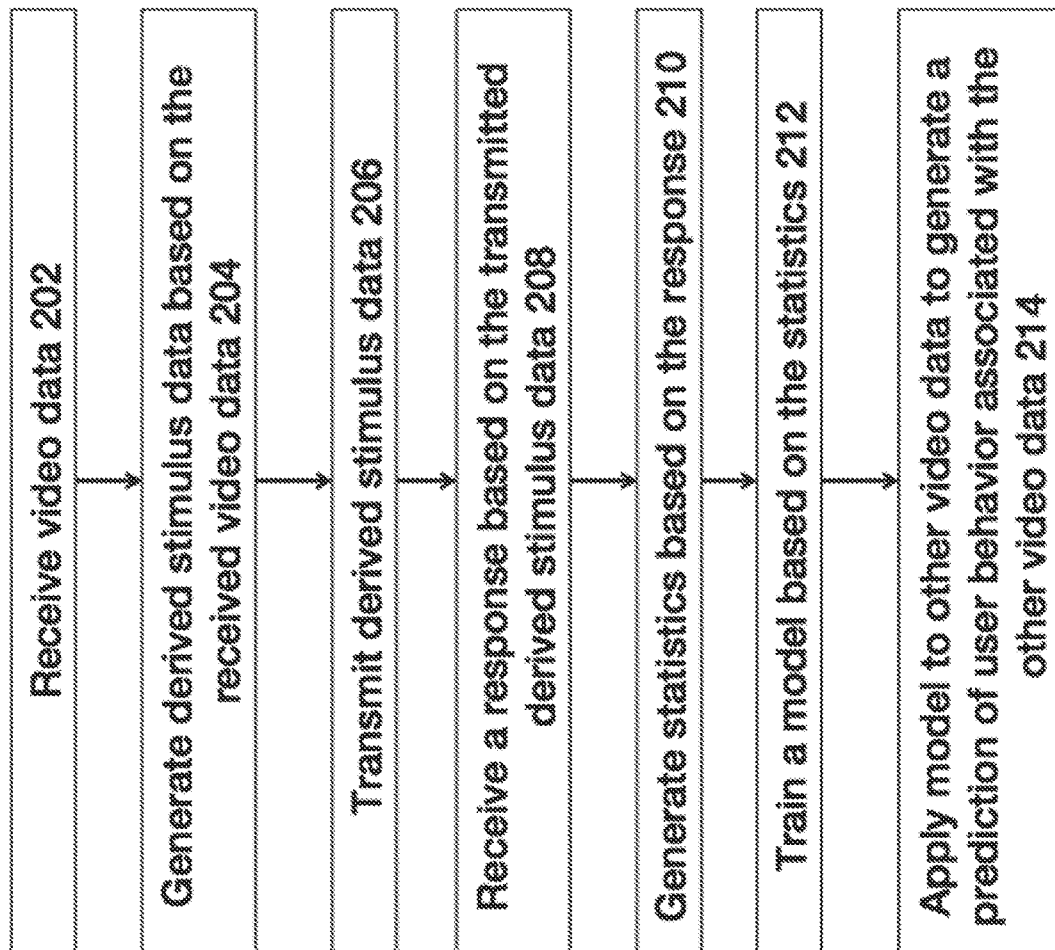
FIG. 2A is a flow chart showing a process of predicting human behavior, according to some embodiments of the present disclosure.

FIG. 2A is a flow chart showing a process of predicting human behavior, according to some embodiments of the present disclosure. In one implementation, video or other data is captured by a camera or sensor mounted on the vehicle 102. The camera or other sensor can be mounted in a fixed or temporary manner to the vehicle 102. Of course, the camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 202, this video or other data captured by the camera or other sensor is transmitted from the vehicle 102, over the network 104, and to the server 106 where it is stored.

Then, in step 204, video segments or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 214 and in the text accompanying FIG. 9, as part of the training process for the prediction algorithm, human observers view the derived stimulus and predict how they believe the humans shown in the derived stimulus will act. In yet a further implementation, after the video segments or segments are extracted from the stored data, the derived stimulus is generated by manipulating the pixels or equivalent array data acquired from the camera or other sensor in step 204, producing a new data file that conveys a portion of the information from the original video with certain aspects highlighted or obscured, as described below in FIG. 4.

Figure 2B:
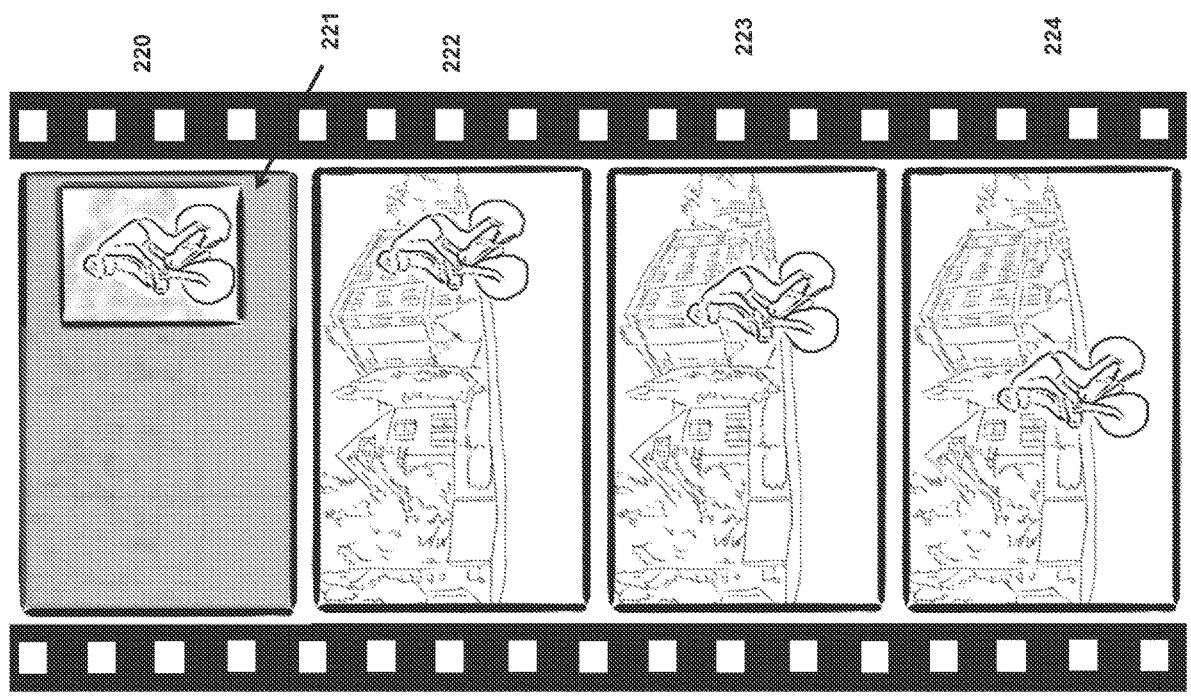
FIG. 2B shows an example of a derived stimulus, according to some embodiments of the present disclosure.

FIG. 2B shows an example of a derived stimulus, according to some embodiments of the present disclosure. As shown, three non-consecutive frames 220, 222, 223, and 224, are extracted from a short segment of video. A copy of the first frame is made 220. On the copy of the first frame 220, a box 221 is drawn around the figure of interest, highlighting that figure. The copy of the first frame 220 and the three extracted frames 222, 223, and 224 are then recombined into a short video segment that loops. This encourages human observers to focus on a figure of interest in the video segment.

In step 206, the derived stimulus is transmitted from the server 106 and displayed to a large number of users (or human observers) on the user terminal 108 (or multiple terminals 108). The terminal(s) 108 prompt the human observers to predict how the people shown in the derived stimulus will act, and upon viewing the displayed stimulus, the observers input their responses corresponding to their predictions. For example, in the derived stimulus shown in FIG. 2B, the human observers may predict that the bicyclist will continue riding to the left in the figure. In other derived stimuli, the responses may predict whether a first person in the stimulus will cross the street, another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the terminal(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 208, the derived stimulus and associated human observer responses are transmitted from the terminal(s) 108 to the server 106 and recorded in the user response database 110.

In step 210, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 212, the stored statistics and corresponding images (e.g., the video segments or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video segments that the summary statistics were generated from. In one implementation, this subset includes the pixel data contained in a box (such as the box 221 shown in FIG. 2B) drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 214, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

Figure 3:
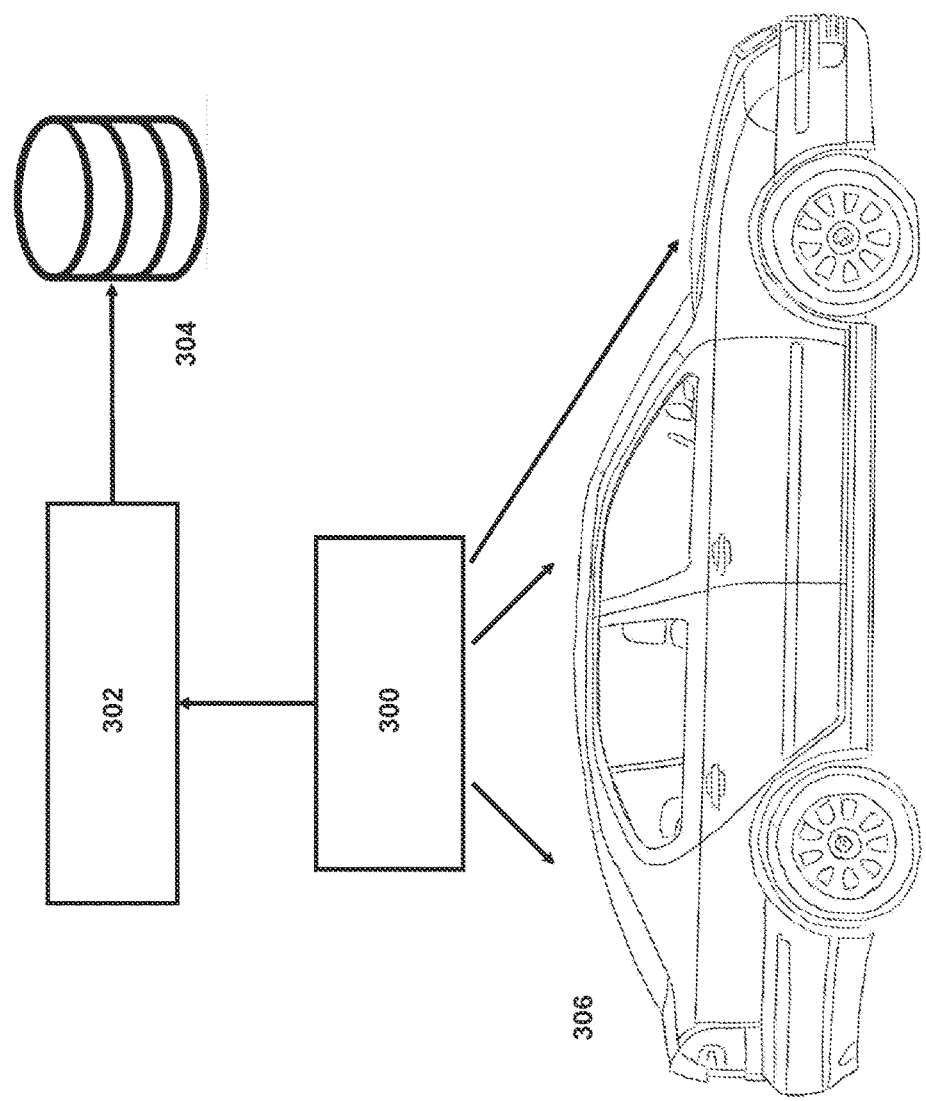
FIG. 3 is a system diagram showing a sensor system associated with a vehicle, according to some embodiments of the present disclosure.

FIG. 3 is a system diagram showing a sensor system associated with a vehicle, according to some embodiments of the present disclosure. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video segments.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
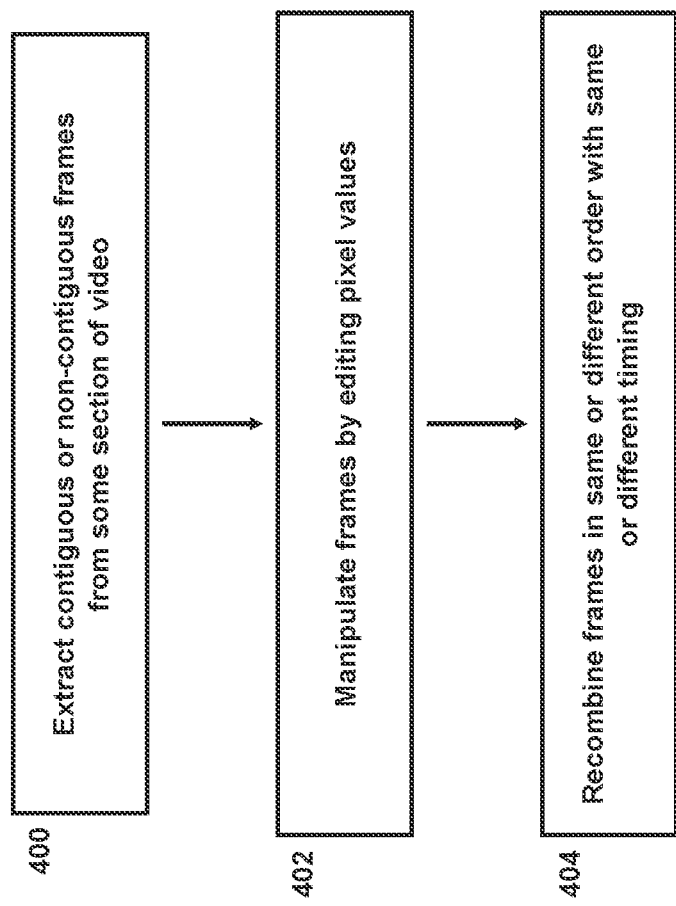
FIG. 4 shows a process of generating derived stimuli from raw camera or sensor data in the vehicle, according to some embodiments of the present disclosure.

FIG. 4 shows a process of generating derived stimuli from raw camera or sensor data in the vehicle, according to some embodiments of the present disclosure.

Referring to step 400, video or data frames are selected according to a method which selects either random or specific frames from video or sensor data segments. As described above, sensor data can include video segments or specific frames. These frames can either be contiguous or non-contiguous, and can be in the original order, in a permuted order, in reverse order, or in random order. Some of the frames can be repeated once or more than once. The frames are selected so that when human observers are later presented with reordered versions of the sequences of frames, they perceive either the actual motion of humans in the scene that was captured in the original video, or motion that is a product of the ordering of the frames but which diverges via reordering from the motion that was originally captured. The temporal information that the human observers looking at the sets of images or derived stimulus are able to use to answer questions about the sets of images may be therefore limited or expanded to include specific temporal cues that were or were not in the original sequence.

Referring to step 402, some of the frames can be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian.

Referring to step 404, frames can be recombined to form a derived stimulus. In some embodiments, if there is only one frame that frame comprises the derived stimulus. If there is more than one frame those frames may then be recombined. The recombination into a temporal segment can involve the frames having the same display time and interval as in the original video clip or could involve faster, slower or variable display times. The timing of the recombination is chosen in order to shape the perceived temporal duration of the activities visible in the original video segment so the judgments the observers make will rely on temporal information that is or is not identical to that featured in the original image.

Figure 5:
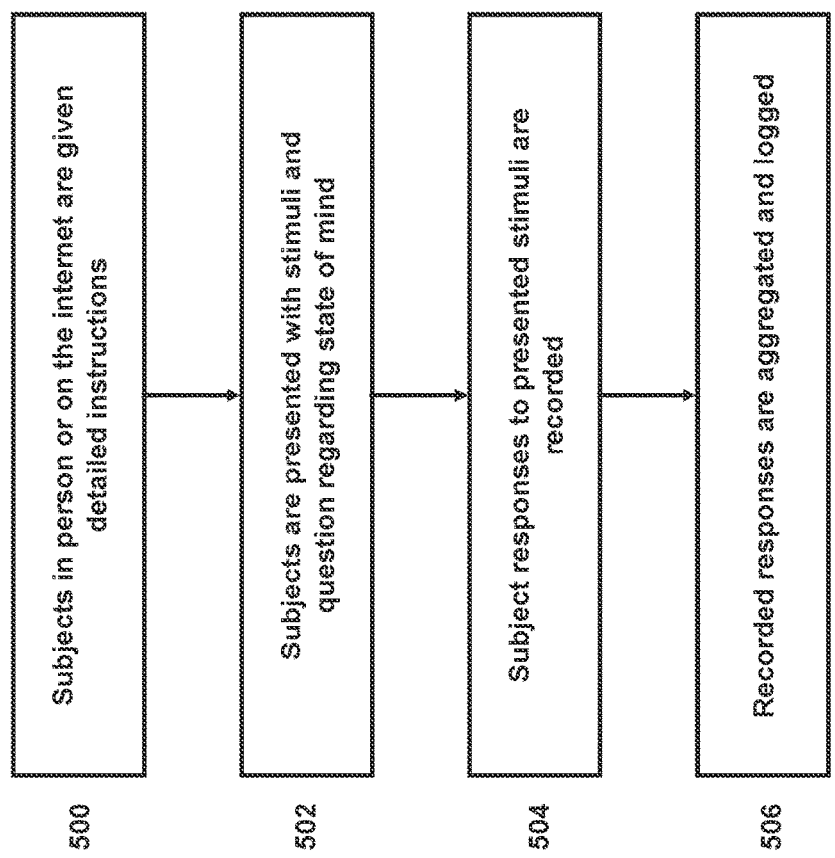
FIG. 5 is a flowchart showing a process of collecting predictions and other information from human observers based on derived stimuli, according to some embodiments of the present disclosure.

FIG. 5 is a flowchart showing a process of collecting predictions and other information from human observers based on derived stimuli, according to some embodiments of the present disclosure. In step 500, human observers are given detailed instructions about how to answer questions about derived stimuli. In step 502, those observers are presented with derived stimuli and asked to answer questions about them. In step 504, the observers respond to the stimuli and those responses are recorded. In step 506, the recorded responses are aggregated and logged in a database. For example, the responses may be sent to and logged in the user response database 110 (FIG. 1).

Referring to step 500, in one example, some number of human observers (two or more) are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations. For example, if human observers are asked to judge the intention of a pedestrian to walk in front of a car, the instructions may be: "In this test, we want you to pretend you're driving a car. You'll see road scenes with cyclists highlighted, and you'll have to decide what they're planning to do. Try to answer as quickly as you can. If a box contains more than one cyclist, try to judge if any of them intends to ride into the path of your car. Some of the images might be small, or dark, but just do your best."

Referring to step 502, the human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment. The judgment that the human observer makes is an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver" is definitely attentive" or "the other driver is definitely not attentive". The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

Referring to step 504, the explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

Referring to step 506, the responses are aggregated and recorded in a data structure, such as the user response database 110 (FIG. 1). This data structure is then sent as a text field to a networked computer system running database software and logged in a database.

FIG. 6 shows a data structure (e.g., table) associated with tracking video segment data according to some embodiments of the present disclosure. Column 600 shows an example of a unique identifier for each human observer who rated an image. Column 602 shows a unique identifier for a given derived stimulus. Column 604 shows an example of a response from an observer recorded in the database. Column 606 shows an example of additional information—in this case response time—recorded by the database.

In reference to column 600, each observer who is shown the stimuli is given a unique identifier so that information about their response may be analyzed in the context of their responses to other images.

In reference to column 602, each derived stimulus that is rated by a human observer is listed with a filename and path that uniquely identifies that derived stimulus, and also indicates the original video segments from which that derived stimulus was generated.

In reference to column 604, for each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1 as shown in FIG. 6) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

In reference to column 606, an amount of time associated with a subject responding to the derived stimulus is also recorded. In some embodiments, this time is associated with the overall reliability of the human observer's rating. For example, a response associated with a lower response time may be weighted higher and a response associated with a slower response time may be weighted lower.

Figure 7:
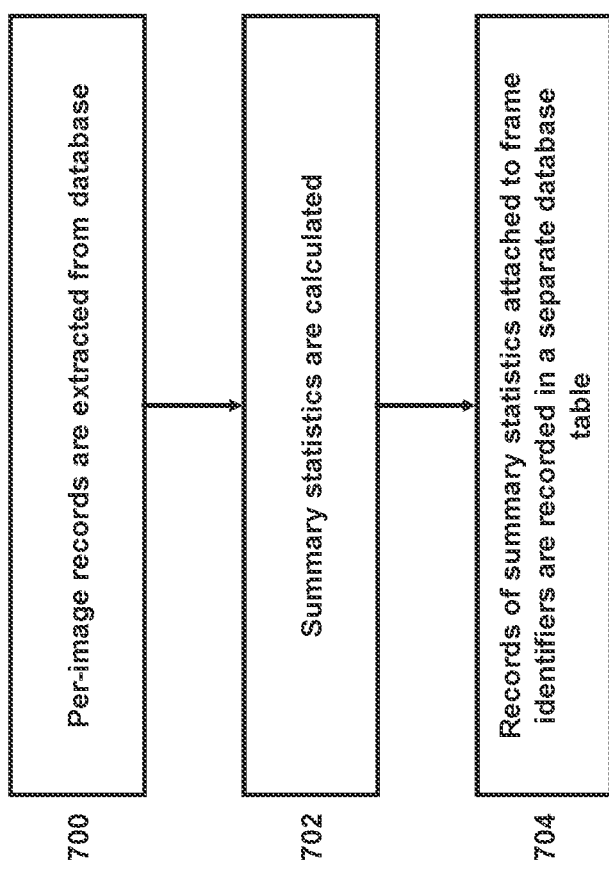
FIG. 7 is a flowchart showing a process for producing summary statistics of a video segment or derived stimulus according to some embodiments of the present disclosure.

FIG. 7 is a flowchart showing a process for producing summary statistics of a video segment or derived stimulus according to some embodiments of the present disclosure. In step 700, per-image results are extracted from the database which stores responses from a human observer. In step 702, summary statistics are calculated using those per-image results. In step 704, records of the summary statistics attached to frames from the raw car data (not the derived stimuli) are recorded in a separate table.

Records of all of the responses by human observers on a given task for a given frame are extracted from the database in step 700. In one example, all of the responses of a given type are aggregated into a single data structure.

This data structure is queried to produce summary statistics in step 702. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above.

The calculated summary statistics are recorded in a database table in step 704 attached to a unique identifier which links them to the video segment or sensor data frame associated with the responses from which they were calculated.

Figure 8:
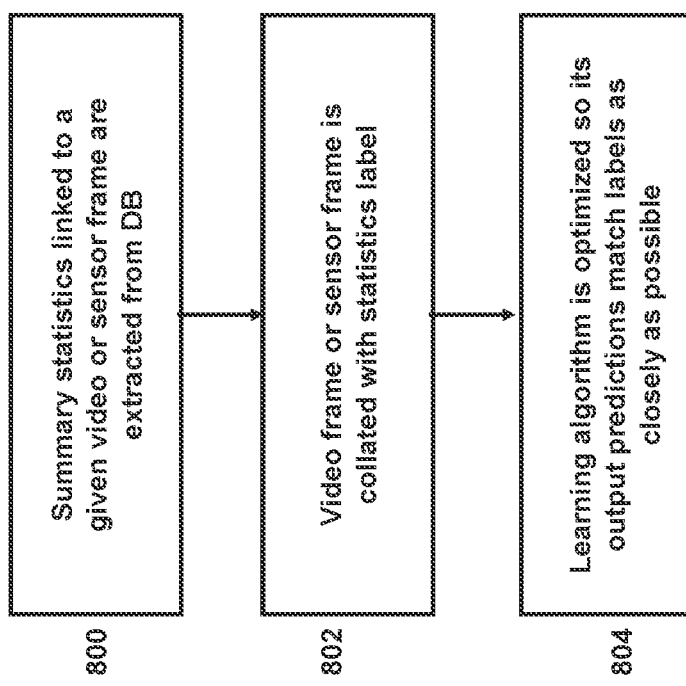
FIG. 8 is a flowchart showing a process of training a learning algorithm using summary statistics, according to some embodiments of the present disclosure.

FIG. 8 is a flowchart showing a process of training a learning algorithm using summary statistics, according to some embodiments of the present disclosure. For example, in one embodiment, the process may train an algorithm used in the model training system 112 in FIG. 1. In step 800, summary statistics linked to a given video or sensor frame are extracted from the database 110 in FIG. 1. Subsequently, in step 802, the video or sensor frame may be collated with the statistics label for the frame. The collated frame is provided to the learning algorithm in the model training system 112 in step 804, and this process yields a final learning algorithm in step 806.

In some embodiments, between one and three partitions are generated from the database records in step 800. These partitions each comprise a list of images in the set of images that have been manipulated to create derived stimuli and rated by human observers. At least one of these partitions is made to comprise a set of training data. An additional partition may be created to use as a set of validation data, a second list of images in the set of images that have been manipulated to create derived stimuli and rated by human images, but where the second validation set is not shown to the model in the learning phase, but is instead preserved to be used later for evaluation.

The list of images in the training data partition is collated with some or all of the summary statistics that have been generated from the human observer responses to those images and stored in the database in step 802, such that the summary statistics are associated with the appropriate image in the list which comprises the training partition.

Each combination of image and summary statistics comprises a single training sample for the learning algorithm in step 804. The algorithm may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

The learning algorithm is optimized by a process of progressively adjusting the parameters of that algorithm in response to the characteristics of the images and summary statistics given to it in the training phase to minimize the error in its predictions of the summary statistics for the training images in step 804. In one embodiment of the model training system 112, the algorithm can be a deep neural network. In this embodiment the parameters are the weights attached to the connections between the artificial neurons comprising the network. Pixel data from an image in a training set collated with human observer summary statistics in step 802 can serve as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set collected via step 802. At the end of this process the model is "trained", which in some embodiments, means that the difference between the summary statistics output by the neural network and the summary statistics calculated from the responses of the human observers in step 506 is minimized.

Figure 9:
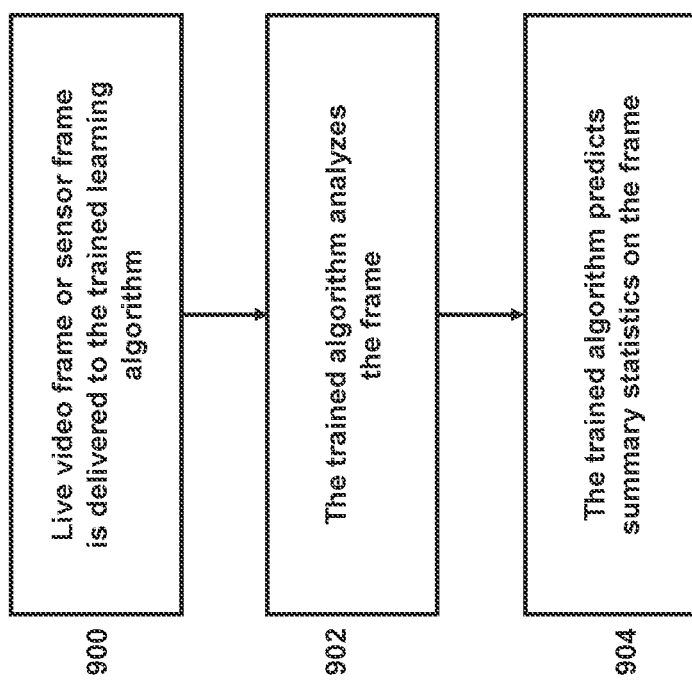
FIG. 9. is a flowchart showing a process of predicting the state of mind of road users using a trained learning algorithm, according to some embodiments of the present disclosure.

FIG. 9. is a flowchart showing a process of predicting the state of mind of road users using a trained learning algorithm, according to some embodiments of the present disclosure. In step 900, the training algorithm receives a "real world" or "live data" video or sensor frame. Then in step 902, the trained algorithm analyzes the frame, thus enabling the algorithm in step 904 to output a prediction of summary statistics on the frame.

The "real world" or "live data" video or other sensor frames from a car-mounted sensor are delivered to the trained learning algorithm in step 900. These frames have the same resolution, color depth and file format as the frames used to train the algorithm. These frames are delivered as individual frames or as sequences according to the format used to train the original algorithm.

Each of these frames is analyzed by being passed through the trained model in step 902. In one embodiment, the data from the frame that was passed through the model would comprise the pixel data from a camera. This data would be transformed by an artificial neural network that had been trained according to step 804. At the final stage of the processing in the artificial network, it would produce an output. This output is the model output in step 904.

The model outputs a number or set of numbers that comprise the predicted summary statistics for the "real world" or "live data" image in step 904. The predicted summary statistics are the model's best estimation of what the summary statistics would be on the image if the image had human annotations collected. The prediction is generated automatically by passing the sensor data through the model, where the information is transformed by the internal mechanisms of the model according to the parameters that were set in the training process shown in step 804. Because these summary statistics characterize the distribution of human responses that predict the state of mind of a road user pictured in the stimulus, the predicted statistics are therefore a prediction of the aggregate judgment of human observers of the state of mind of the pictured road user and thus an indirect prediction of the actual state of mind of the road user.

Figure 10:
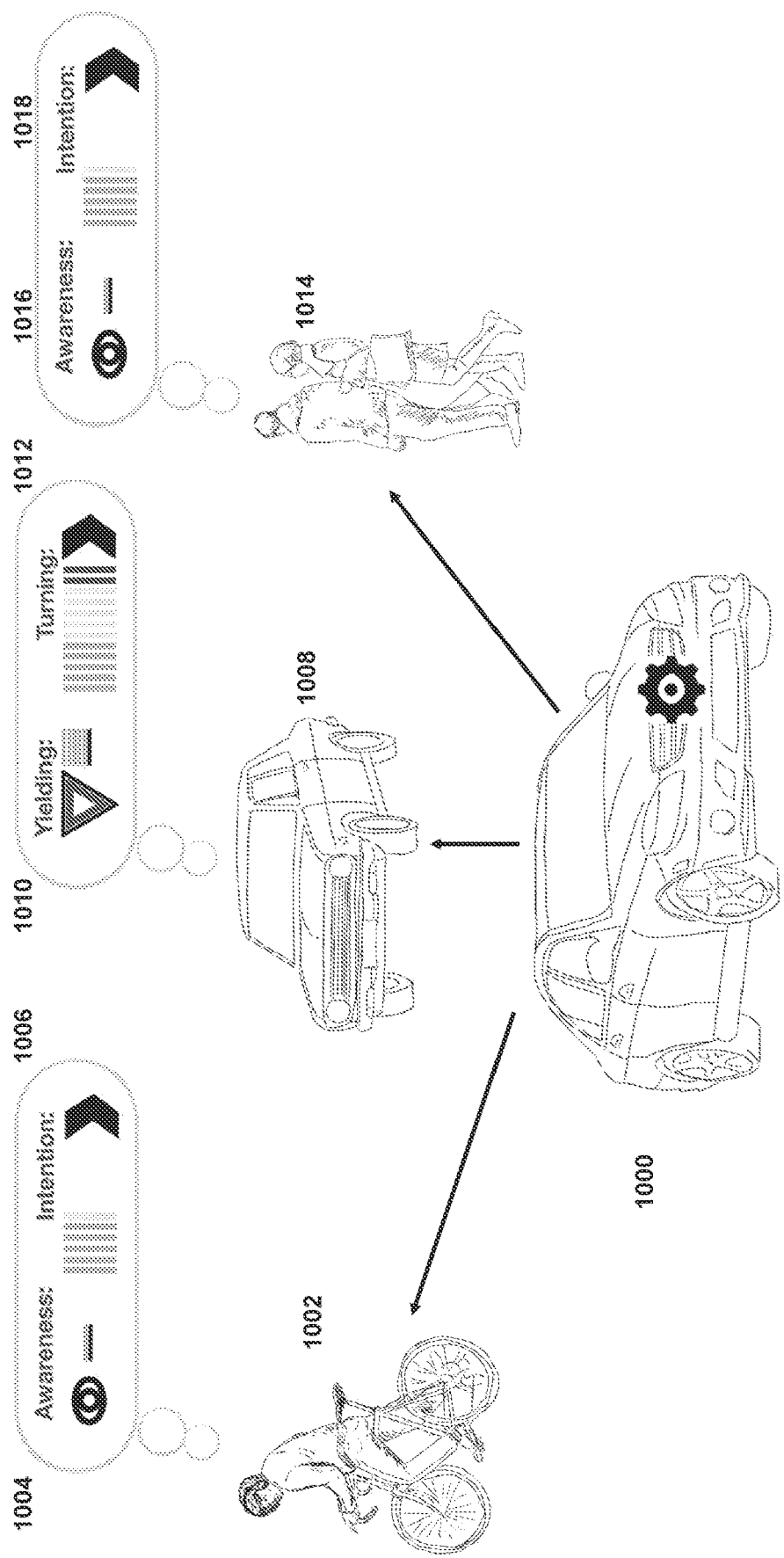
FIG. 10 is a diagram showing an example of an application of a context user prediction process in an automobile context, according to some embodiments of the present disclosure.

FIG. 10 is a diagram showing an example of an application of a context user prediction process in an automobile context, according to some embodiments of the present disclosure. In this example intention 1006 1018 means that the road user 1002 1014 has the goal of moving into the path of the vehicle 1000 before the vehicle 1000 (on which the system is mounted) reaches their position. Awareness 1004 1016 in this example means that the road user 1002 1014 understands that the vehicle on which the system is mounted 1000 is present in their vicinity. In this example, when cyclist 1002 rides into the field of view of a camera mounted on vehicle 1000, the pixel data of the camera image of the cyclist is fed to a trained algorithm as described above in step 900. The trained algorithm analyzes the image as described above in step 902. The trained algorithm would predict summary statistics as in step 904. These summary statistics are an estimate of what the summary statistics would be for a collection of human observers who were shown a derived stimulus of the camera data as in step 504. The estimates summary statistics are therefore the system's best answer to the question "does this cyclist intend to enter the path of the vehicle." The vehicle is therefore able to make a guess 1006 about the intention of the cyclist that is closely matched to the guess that a human driver would make in that same situation. In this example, the intention of the cyclist 1006 is relatively high, as indicated by the number of horizontal bars in the display. The system installed on an automobile 1000 also makes predictions about the awareness 1004 of cyclists of the vehicle 1000, by the same method described for intention. It also makes predictions about the willingness of an automobile 1008 to yield 1010 or its desire to turn across the system-containing vehicle's path 1012 by the same method described above. In the case of the automobile the questions that human subjects answered that would be predicted by the algorithm are "would the vehicle be willing to yield" 1010 and "does the vehicle wish to turn across your path" 1012. It also makes predictions about the desire of pedestrians 1014 to cross in front of the vehicle 1018, and whether those pedestrians are aware of the vehicle 1016, by the same method described above.

The models described above can be implemented as a real-time module that makes predictions of road user behavior based on input from cameras or other sensors installed on a car 1000. In the case of an autonomous car, these predictions can be used to make inferences about the intent of road users such as cyclists 1002, other motorists 1008, and pedestrians 1014 to cross into the path of the car, as well as whether the road users are aware of the car and its future path. They can also be used to predict whether other road users would be surprised, welcoming, or aggressively unwelcoming if the car were to engage in maneuvers which would take it into the path of another road user (e.g., would an oncoming car yield if the car implementing the systems and methods described herein were to turn left).

Machine Learning Based Models for Predicting Behavior of Human Interaction with Moveable Devices A computing device receives training video segments of an environment that a moveable device operates in, the training video segments being taken from a perspective of the moveable device. The training video segments are presented to human annotators via a user interface with a plurality of questions regarding a state of mind of a person in the training video segments. User responses to the plurality of questions are received from the human annotators, and the computing device aggregates the user response to form statistical data for training a machine learning model. The machine learning model is applied to new video segments, and a prediction of state of mind of a person in the new video segment is generated and used to control the moveable device.

Described below are examples of additional systems that determine actions to be performed based on behaviors of people in the surrounding environment as predicted by a trained machine learning model. The actions may be performed by a moveable device or recommended to be performed by a human operating the moveable device. In some embodiments, a system (e.g., delivery robot, forklift, factory arm, low-flying drone, hospitality or security robot) may be a moveable device. As the moveable device performs a task, one or more cameras mounted on the moveable device capture video segments of the environment of the moveable device that may include one or more persons within a threshold distance of the moveable device. The captured video segments are inputted to a machine learning based model (also referred to as "model" herein) trained to predict summary statistics describing the state of mind of people displayed in the video segments. Based on the predicted summary statistics associated with the input video segments, instructions for controlling the moveable device is determined in real-time to perform actions that are safe for the system and the people nearby. In some embodiments, the system may be a stationary system (e.g., airport monitoring system, amusement park monitoring system, traffic monitoring system, store monitoring system) including one or more cameras mounted at fixed locations (e.g., on a wall, on a ceiling, on a checkout stand) and configured to capture video segments of predetermined areas. The captured video segments may be used by the model to predict behaviors of individuals or groups of people (i.e., behavior of crowd observed by a camera). The predicted behavior may be used to determine an action to be performed for managing movement of people captured in the video segments. Methods of creating stimulus data, generating training dataset, training the machine learning based model, and other elements are described in FIGS. 1 through 10.

The system may be connected to the server 106, the user response database 110, the user terminal 108, the model training system 112, and the prediction engine 114 described in detail above with respect to FIG. 1. The captured video segments from the system may be provided as input to the prediction engine 114 that applies a machine learning based model trained to predict the summary statistics describing state of mind of people included in the video segments. In some embodiments, the prediction engine 114 may apply a model depending on a type of system that provided the input video segments. For example, the prediction engine 114 may use a first model to make predictions for a delivery robot and use a second model different from the first model to make predictions for a drone. The machine learning based models used by the prediction engine may be trained using responses from human annotators that are presented with training video segments illustrating situations that a corresponding system may encounter. The user response is received for questions associated with state of mind of a person displayed in an image or video segment, for example, questions about the intention, awareness, personality, state of consciousness, aggressiveness, enthusiasm, thoughtfulness, or another characteristic of the state of mind of the people in the training video segments. Training datasets may be generated based on summary statistics of user responses received from the human annotators describing the state of mind of the people in the training video segments and used to train a machine learning based model.

For a given training video segment, a group of human annotators may be asked to answer one or more questions selected from a question bank including possible questions regarding people's behaviors in various settings and situations. In some embodiments, the question bank may be associated with a configuration file that allows users associated with a system to customize a set of questions to be presented to annotators for generating training datasets for the model used by the system. In other embodiments, the model training system 112 may select questions that are likely to be relevant to a training video segment. The model training system 112 may select the questions based on features of the system that captured the training video segment (e.g., types of tasks the system is configured to perform, range of motion of the system) and/or features extracted from the training video segments (e.g., characteristics of the environment in the training video segments based on image recognition, metadata). The model training system 112 may cluster questions in the question bank into groups, and based on the features, identify one or more groups of relevant questions. In some embodiments, one or more questions in the question bank may be received from experts or users associated with the system. As an example, for a delivery robot, manufacturers of the delivery robot, purchasers of the delivery robot, or customers using the delivery robot may provide questions that are of interest in that specific context. Example questions that may be presented to the annotators responsive to presenting the training video segments, and control instructions based on predicted summary statistics are described below in context with various systems and various types of moveable devices.

Delivery Robot

An autonomous delivery robot (also referred to as "robot" herein) may be deployed to deliver objects to a destination location. The robot may pick up objects from a pick-up location (e.g., a warehouse, a grocery store, a restaurant) and travel to the destination location to deliver the objects. In the process of picking up the objects from the pick-up location, travelling to the destination location, and dropping off the objects at the destination location, the robot may encounter one or more people (e.g., employees of warehouse or store, pedestrians, drivers, recipient). As the robot performs tasks, one or more cameras mounted on the robot may capture video segments of the surrounding environment, and the video segments are passed through a trained model that predicts summary statistics about behaviors of the people in the video segments. The predicted summary statistics are used to determine control instructions for operating the delivery robot to successfully pick up and deliver objects.

When the robot is deployed, the robot may go to a pick-up location to pick up the object. The pick-up location may be a store (e.g., grocery store, restaurant, retail store), a warehouse, a mail room, an office, or any other location for picking up an object that needs to be delivered. To pick up the object, the robot is configured to interact with a person that loads the robot with the object. For example, the pick-up location may be a grocery store, and the robot may receive an order of groceries from an employee. However, at the pick-up location, if there are multiple people present, the machine learning model may be used by the robot to predict the state of mind of people captured in the video segments to determine which person to interact with and how to interact with the person.

To generate training datasets for training a machine learning based model used to predict the state of mind of a person in input video segments, training video segments of captured by delivery robots may be presented to a plurality of human annotators, and for each training video segment, request that the annotators answer questions about the situation depicted in the video segment. For example, the annotators may be presented with the instructions: "In this test, we want you to pretend that you are a delivery robot. You will see a person that is highlighted in the video segment, and you will be presented with questions regarding characteristics, attributes, and intended actions of the pictured person." Examples of questions that are asked include "does the highlighted person intend to interact with the robot," "does the highlighted person have intentions to damage the robot," "is the highlighted person have intention to load an object," "is the highlighted person aware of the robot," and "does the highlighted person intend to enter the path of the walking in the path of the robot." For a particular question, the annotators may be presented with multiple values, each value representing a range of likelihood of the person having a particular state of mind. The annotators select a particular value indicating the range of value of likelihood of the person having that state of mind. After receiving user responses to the questions presented with a particular training video segment, summary statistics of the user responses for the training video segment are used to create training dataset to train the model to predict the state of mind of a person depicted in an input video segment.

The robot may capture new video segments of its surroundings and provide the new video segments to the trained model. The trained model predicts summary statistics representing what the summary statistics would be if a group of annotators were presented with the new video segment and asked to answer questions regarding behaviors of people captured in the new video segments. The summary statistics is used to make inferences about the state of mind of the people in the robot's environment and used to determine a course of action for the robot, for example, to determine how the robot interacts with a person identified in an image captured by a camera mounted on the robot.

The predicted summary statistics may include awareness of the robot which indicates whether a person understands that the robot is present in their vicinity and intention of the person to act in a certain way. For example, in the context of the robot at a pick-up location, the predicted summary statistics may be used to predict whether a person approaching the robot is an employee or a shopper, disambiguate between an employee who happens to be near the robot from an employee that is approaching the robot with intention to interact with the robot, whether a person has intention to approach the robot and load groceries, whether a person is aware of the robot being in their vicinity, whether a person would be startled by the robot, whether a person may act aggressively towards the robot, whether a person has intention to move in the path of the robot, whether a person has intentions to yield to the robot, and other predictions regarding the person's state of mind.

Based on the predicted summary statistics associated with the new video segments, the robot determines how to interact with a person. For example, if there is a likelihood above a threshold that a person is likely to be an employee with intentions to interact with the robot to load an object to be delivered, the robot may wait in place for the person to approach the robot or approach the person. The robot may open the compartment that holds delivery objects. Prior to allowing the person to load, the robot may request credentials from the person (e.g., request a unique code, an employee badge) and unlock the compartment after verifying the credentials. If there is a likelihood above a threshold that a person is an employee but has low intentions to interact with the robot, the robot may continue to move and search for a user that has above threshold likelihood of interacting with the robot, for example, a user with greater than a threshold likelihood of having an intention to load the robot with the objects to be delivered. The robot may turn on a visual sign to make it easier for the right employee to locate the robot. If there is a likelihood above a threshold of a person acting aggressively toward the robot (e.g., kick the robot, hit the robot, force the compartment open), the robot may sound an alarm or contact a human operator, move away from the person to avoid interacting with the person, or move around the person.

After the robot has picked up the object, the robot travels to the destination location. Depending on the route between the pick-up location to the destination location, the robot may travel on sidewalks, crosswalk, streets, and/or inside buildings and encounter different types of people including pedestrians, cyclists, and motorists. The robot may use the trained model to make predictions on the state of mind of a person near the robot similar to the vehicle 1000 described with respect to FIG. 10 that determines awareness that a person (e.g., cyclist 1002, motorist 1008, pedestrian 1014) has for the vehicle, intentions of a person to move in the path of the vehicle 1000, intentions of a person to yield to the vehicle, intention of a person to move straight, turn left, or turn right, and other predictions on the state of mind of a person. Based on the predicted summary statistics representing the state of mind of the person, the robot determines a next course of action.

For example, while the robot is moving on a sidewalk, the robot may capture new video segments of a pedestrian walking near the robot. The new video segments are provided to the model which makes predictions for summary statistics about how aware the pedestrian is of robot, the willingness of the pedestrian to yield to the robot, intention of the pedestrian to move into or out of the path of the robot, or intention to approach the robot. Examples of questions that human annotators answered that would be predicted by the model may include "is the person aware of the robot," "does the person have intention to yield or move out of the way," "does the person have intention to interact with the robot," and "does the person have intentions to harm the robot." Based on the summary statistics, the robot may determine whether to stop moving until the pedestrian passes by the robot, reroute to move out of the pedestrian's way, sound an alarm or flash a signal to make the pedestrian aware of the robot, move at a slower speed, move at a faster speed, turn back and move away, or other appropriate actions to perform.

When the robot reaches the destination location, the predicted summary statistics based on new videos captured at the destination location may be used to predict whether a person is approaching to pick up the object. If there is a likelihood above a threshold of the person having the intention to pick up the object, the robot may request a verification (e.g., unique code, identification badge, biometrics, confirmation email) to confirm that the object belongs to the person. After verifying that the person is authorized to access the object, the robot may unlock the compartment with the object to allow the person to take the object. In contrast, if the person fails to verify their identity, the robot may ask the person to try verifying their identity again and keep the compartment locked, contact a human operator or authority, sound an alarm, and/or move away from the person. The predicted summary statistics may also be used to determine if the person has intentions to harm the robot or attempt to steal from the robot, and if there is a likelihood above a threshold of the robot being in danger, the robot may contact a human operator or authority, sound an alarm, and/or move away from the person.

Forklift

Machine learning models according to various embodiments are used in an automated forklift used to lift and move cargo in warehouses, construction sites, manufacturing facilities, loading docks, and other locations that manage heavy and bulky items. The forklift may operate in an environment with people (e.g., truck drivers, warehouse workers, manufacturing workers, construction workers). The automated forklift uses a machine learning based model to predict the state of mind of the people in the surrounding environment. One or more cameras configured to capture video segments of the surrounding environment are mounted on the forklift. The video segments illustrating people in the surrounding environment are provided to the machine learning model for predicting summary statistics describing state of mind of the people, and the predicted summary statistics are used to determine control instructions to operate the forklift in a way that is safe for people and the forklift.

The machine learning model is trained using responses from human annotators to questions asked with respect to training video segments collected by cameras mounted on forklifts, and the trained model may be used to predict summary statistics describing the state of mind of people in the input video segments. Human annotators are presented with the training video segments and one or more questions regarding state of mind of people in the training video segments. Since ordinary people do not have experience working around forklifts, the human annotators may be selected from people having experience operating heavy machinery, for example, forklift operators, truck drivers, warehouse workers, manufacturing workers, construction workers, safety specialists, or other professionals with insights on how people behave around forklifts. The questions provided to annotators may be selected from a question bank, where the question bank includes questions received from professionals familiar with forklifts.

The annotators may be presented with one or more training video segments with the instructions: "In this test, we want you to pretend that you are a forklift operator. You will see a person that is highlighted in the video segment, and you will be presented with questions regarding characteristics, attributes, and intended actions of the pictured person." Examples of questions that are asked may include one or more of "is the highlighted person aware of the forklift," "is the person distracted or otherwise unable to see the forklift," "is the person in the path of the forklift," "if the person is in the path of the forklift, does the person have intention to move out of the way of the forklift," "if the person is in the path of the forklift, does the person expect the forklift to pause operation," "if the person is not in the path of the forklift, is the person aware of the forklift," "if the person is not in the path of the forklift, does the person have intention to move into the path of the forklift." From summary statistics of user responses to the questions presented with the training video segments, the training datasets is generated to train the model for predicting the state of mind of people in situations surrounding a forklift.

As a forklift operates, the forklift collects new video segments and provides the new video segments to the trained model that predicts summary statistics describing the state of mind of people in the new video segments. Based on the summary statistics, control instructions for the forklift is generated. For example, if the likelihood of the person having seen the forklift and being aware of the forklift is above a threshold, the forklift may continue to perform its task. However, if the likelihood of the person being aware of the forklift is below the threshold, the forklift may pause operation and sound an alarm until the person is made aware of the forklift. Once the threshold of the person being aware of the forklift is above the threshold in subsequently captured video segments, the forklift may then continue its operation.

If a person is in the path of the forklift, the summary statistics may be used to predict whether the person has intentions to move out of the way of the forklift or to stay in place for the forklift to move around the person. The forklift may determine whether to continue operation and if so, which direction to move. If the person is not currently in the path of the forklift, the intention of the person to move into the path of the forklift may be predicted. If the person has intention above a threshold to move into the path of the forklift, the forklift may pause operation and sound an alarm or flash signs to warn the person. If the person has a low intention to move into the path of the forklift, the forklift may continue its operation along its predetermined path.

Factory Arm

An automated factory arm may perform production-related tasks without human intervention. The factory arm may perform tasks such as welding, assembly, pick and place, packaging, labeling, product inspection, and testing. The factory arm may be operated in a facility with people, and the factory arm may use a machine learning based model to predict summary statistics describing state of mind of the people nearby based on input of video segments captured using one or more cameras mounted on the factory arm. Based on the predicted summary statistics, control instructions for operating the automated factory arm is determined.

The model for predicting people's behaviors around a factory arm may be trained using training video segments collected by cameras mounted on factory arms. The training video segments may be collected from a plurality of different factories and factory arm types. In some embodiments, the model may be selected from a plurality of models, where each model of the plurality of models is associated with a specific type of factory or factory arm. Human annotators may be presented with one or more of the training video segments with the instructions: "In this test, we want you to pretend that you are a factory arm operator. You will see a person that is highlighted in the video segment, and you will be presented with questions regarding characteristics, attributes, and intended actions of the pictured person." With the one or more training video segments, questions such as "is the highlighted person aware of the factory arm," "does the person intend to enter the work area of the factory arm," "does the person intend to move into a path of motion of the factory arm." From summary statistics of user responses to the questions presented with the training video segments, a training dataset used to train the model for predicting state of mind of people around a factory arm is generated.

While a factory arm is operating, the factory arm collects new video segments that are provided to the trained model configured to predict summary statistics describing a state of mind of people displayed in the new video segments. If the summary statistics indicate that a likelihood of the person being aware of the factory arm is above a threshold and/or intention of the person to enter the work area or in the path of motion of the factory arm is below a threshold, the factory arm may continue performing its task since the person is unlikely to be in the way. However, if the likelihood of the person being aware of the factory arm is below the threshold and/or the intention of the person to enter the work area or in the path of motion of the factory arm is above the threshold, the factory arm may stop operation and sound an alarm to make the person aware of the factory arm or to warn the person not to enter the work area. The factory arm may continue to pause and sound the alarm until the likelihood of the person being aware of the factory arm is above the threshold and/or the intention of the person to enter the work area is below the threshold before continuing to perform the predetermined task to avoid accidents.

Depending on the type of factory arm and corresponding task, the factory arm may be configured to interact directly with an employee during operation. The summary statistics may be used to distinguish a person who intends to interact with the factory arm to perform the task from a person who accidentally entered the work area. Similarly, during inspections or repairs, the factory arm may be operated with a person nearby. The summary statistics may be used to distinguish a person who is within the work area of the factory arm to inspect or repair while the factory arm operates from a person who unintentionally enters the work area.

Low-Flying Drone

While an autonomous drone is in flight, it may encounter people (e.g., when the drone is landing). If a person is unaware of the drone being nearby, the person may be startled or act unfavorably to the presence of the drone. This can create a dangerous situation for the person and/or the drone. The drone may be equipped with one or more cameras that capture video segments of the surrounding environment while it is in flight. The video segments may include people, and the video segments are inputted to a machine learning based model trained to predict summary statistics describing state of mind of people in the presence of the drone based on the input video segments and avoid potentially dangerous situations.

To generate the training dataset used to train the model, training video segments captured by drones in various locations are presented to a group of human annotators, and for each training video segment, request that the group of human annotators answer questions about the state of the mind of the person. For example, the annotators may be presented with the instructions: "In this test, we want you to pretend that you are a drone. You will see a person that is highlighted in the video segment, and you will be presented with questions regarding characteristics, attributes, and intended actions of the pictured person." Examples of questions may include "is the highlighted person aware of the drone," "does the highlighted person have intentions to interact with the drone," "is the highlighted person likely to act aggressively towards the drone," "is the highlighted person likely to be startled by the drone," and "is the highlighted person likely to move into the path of the drone." Based on an aggregate of user responses to these questions, training dataset for training the model to predict the state of mind of people around drones is generated.

While the drone is in flight, the drone may capture new video segments and provide the new video segments to the trained model. Based on the predicted summary statistics associated with the new video segments, control instructions for adjusting the flight path of the drone may be determined. The summary statistics may be used to determine a likelihood of a user being aware of the drone being nearby. If a likelihood of the user being aware is above a threshold, the drone may receive instructions to continue on its predetermined flight path. However, if the likelihood of the user being aware of the drone is below the threshold, the drone may receive instructions to sound an alarm or display a visual sign to make the user aware of the drone. The summary statistics may also be used to determine a likelihood of a person being startled by the drone or acting unfavorably toward the drone. If the likelihood of the person being startled or acting unfavorably is above a threshold, the drone may be move to a higher altitude or in an opposite direction to avoid approaching the person.

In some embodiments, the model may also be trained to predict behaviors of another drone that is flying nearby by predicting the state of mind of the person controlling the other drone. The drone may capture video segments of the other drones and provide the video segments to the model that outputs the predicted summary statistics describing the state of the mind of the person controlling the drone. The summary statistics may be used to determine if the other drone intends to enter in its flight path, intends to distract the drone, or intends to act aggressively toward the drone. Based on the predicted behavior of the other drone, the drone may accelerate to move away from the other drone, contact a human operator for assistance, or land.

Hospitality or Security Robot

An autonomous robot may be deployed to perform hospitality or security related tasks in settings such as airports, malls, hotels, offices, warehouses, and stores. For example, the robot may perform tasks such as greeting customers, answering questions, directing customers to a location, retrieving objects for the customer, identifying suspicious activity, and contacting security personnel. The robot may predict behavior of people nearby and determine which task to perform to best assist the people. The robot may determine whether a person is approaching with intentions to interact with the robot or happens to be heading in the robot's direction to avoid harassing a person with no intentions to interact. To make such predictions, the robot may capture video segments of its surroundings and apply a machine learning based model to the captured video segments that predicts summary statistics about the state of mind of people in the video segments.

To generate the training dataset used to train the model, training video segments captured by robots in various settings are presented to a group of human annotators, and for each training video segment, request that the annotators answer questions about the state of mind of the person. For example, the annotators may be presented with the instructions: "in this test, we want you to pretend that you are controlling a robot at an airport, mall, hotel, office, warehouse, or a store. You will see a person that is highlighted in the video segment, and you will be presented with questions regarding characteristics, attributes, and intended actions of the pictured person." Examples of questions may include "does the highlighted person have intentions to interact with the robot," "does the highlighted person have intentions to ask a question," "is the highlighted person aware of the robot being nearby," "does the highlighted person have intentions to enter in the robot's path," and "does the highlighted person have intentions to act inappropriately (e.g., act aggressively, steal)." Based on an aggregate of user responses to these questions, a training dataset may be generated to train the model.

During operation, the robot captures new video segments of its surroundings and applies the trained model to the new video segments to predict the state of mind of people nearby. If a likelihood of a person looking for assistance is greater than a threshold, the robot may approach the person and initiate interaction with the person (e.g., ask the person "how can I help you," present a menu on a screen). The robot may also determine if a likelihood of a person being aware of the robot is above a threshold. If the person is likely to be aware of the robot, the robot may move closer to the person, but if the person is likely to be unaware of the robot, the robot may make a sound and wait for the person to approach. If a likelihood of a person acting inappropriately, the robot may sound an alarm, physically block the person, or contact security personnel for further assistance. If a person has intentions to move in the path of the robot, the robot determines whether to stop moving until the person passes by the robot, reroute to move out of the person's way, sound an alarm or flash a signal to make the person aware of the robot, move at a slower speed, move at a faster speed, or turn back and move away.

Machine Learning Based Models for Predicting Behavior of Crowds

Human operators have a natural ability to predict how people are likely to behave as a group. For example, security cameras are installed to monitor places where large groups of people may gather (e.g., airport, amusement park, store, streets), and human operators can predict how groups of people are likely to behave and determine actions to take to manage movements of the groups of people. However, using "motion vectors" of individuals in the group may not provide accurate prediction in group behavior.

A computing device receives training video segments of an environment (e.g., airport, amusement park, street intersection, store) including a group of people that show a common attribute. The common attribute may describe an aggregate state of mind of the group of people. The training video segments are presented to human annotators via a user interface with a plurality of questions regarding the aggregate state of mind of the group of people. User responses to the plurality of questions are received from the human annotators, and the computing device forms statistical data for training a machine learning model. The machine learning model is applied to new video segments, and a prediction of an attribute of a new group of people in the new video segments is used to determine an action to be performed for managing actions of the group of people. Various applications of machine learning based models for monitoring behavior of crowds are described here.

Airport Monitoring System

In an airport, there may be a large number of people passing through. According to an embodiment, a system including a plurality of cameras installed throughout the airport monitors movements of groups of people and predicts attributes describing the groups of people in the airport to determine actions to perform for improving efficiency and safety at the airport. Video segments captured by the plurality of cameras may be provided as input to a machine learning based model trained to receive video segments of the airport and predict summary statistics describing an attribute of a group of people. An attribute may represent a characteristic shared among the people in the group or an aggregate state of mind indicating a common action that the people in the group intend to take (e.g., move toward security check, stay in place, move to another terminal). Based on the predicted summary statistics describing attributes of one or more groups of people depicted in the video segments, the system predicts how people are likely to behave as a group.

For generating training datasets to be used for training the model, training video segments of various situations that occurred in airports are presented to human annotators via a user interface. The annotators are given instructions are given detailed instructions on how to answer a set of questions about groups of people in the training video segments. In some embodiments, the annotators may be asked to identify if there are one or more groups of people with a common attribute and to mark up the training video segments to identify the people that belong to the one or more groups. For example, the annotators may be presented with the instructions and asked to determine if a group of people displayed in the image have an intent to perform a particular action or a coordinated action (e.g., move as a group to another terminal, stay in the same terminal, change flight, move toward/away from a particular location). A machine learning model identifies the group of people in the image having a shared attribute, for example, standing together, walking in the same direction, and so on. The group of people may be identified in the image using a bounding box. The annotators may select an option describing the likelihood that as an aggregate, the group of people have a particular state of mind. The option may present various ranges of likelihood, or a score identifying different bins representing ranges of likelihood. For example, option 1 indicates a range of likelihood from [0, n1], option 2 indicates a range [n1, n2], option 3 indicates a range [n2, n3], and so on. The group of people have a particular state of mind if more than a threshold number of people in the group have that state of mind.

In some embodiments, the training video segments may be pre-processed prior to being presented to the annotators, and the training video segments may be highlighted to indicate groups of people. For example, a first group of people with a first common attribute may be highlighted in a first color and a second group of people with a second common attribute may be highlighted in a second color. The annotators may be presented with the training video segments with groups of people identified and asked to answer questions regarding common attributes that they see in a particular group.

Examples of questions that the annotators are asked with respect with a given group of people may include "does the highlighted group of people intend to move to another terminal," "does the highlighted group of people intend to stay at the terminal," "does the highlighted group of people show awareness of a particular event," "does the highlighted group of people show intent to check-in their luggage," "does the highlighted group of people show intent to line up for restaurant/restroom/checkpoint/ground transportation." Summary statistics of user responses from the annotators may be determined by aggregating the user responses, and the summary statistics are used to create training datasets for training the model to identify groups of people with a common attribute, predict attributes of groups of people depicted in input video segments. The predicted attributes may then be used to determine a group management action to be performed for managing movement of the groups of people.

When the system captures new video segments of the airport and applies the trained model, the model predicts summary statistics that describe an attribute of a group of people in the new video segments. The predicted summary statistics may be used to predict behavior in the group of people to determine whether to dispatch ground transportation. For example, there may be a large number of people at a given terminal after a plane lands. If there is a likelihood above a threshold of a group of people having intention to move to another terminal to catch a connecting flight, the system may dispatch ground transportation to help the group of people get to their destination quickly. The system may send an alert to airport personnel to send one or more employees to manage the crowd, help the people, direct them in a particular direction, and so on. However, if there is a likelihood below the threshold of the group of people having intention to move, the system may take no action since the group of people may be waiting at the terminal for their next flight. Similarly, the predicted summary statistics is used to automatically determine where to staff employees. If there is a likelihood above a threshold of a group of people intending to go to a particular security checkpoint, restaurant, or ground transportation, the system instructs additional employees to go to the location where additional staffing may be beneficial.

The predicted summary statistics may also be used to detect abnormal situations for dispatching employees such as security personnel or cleaning personnel or dispatching autonomous robots. If there is a high likelihood of a group of people being aware of an event and reacting in response, the system determines that there is likely an event that requires attention and dispatch personnel to the location of the event. For example, if a group of people become aware of an event such as a presence of an object or a person at a location and move away from the location, it may indicate that there is a potentially dangerous situation (e.g., unattended baggage, spill, medical emergency).

The techniques disclosed herein in the context of an airport apply to other environments such as bus terminals, train terminals, and so on, where large crowds of people travel from one location to another and need to be managed or helped.

Event Monitoring System

Techniques disclosed herein for monitoring and automatically managing crowds can be applied to different types of places or events where large crowds occur including amusement parks, theatres or arenas that show concerts or games, large malls, and so on. Embodiments are described in relation to an amusement park but are applicable to the above crowd management situations. For example, an amusement park may be visited by a large number of people, and a system including a plurality of cameras monitors movements of groups of people and predicts attributes describing intent of the groups of people. Based on the predicted attributes, the system may determine an action to be performed to create a safe and enjoyable experience for the visitors.

In an embodiment, video segments captured by the cameras are provided to a machine learning based model trained to receive video segments and predict summary statistics describing an attribute of a group of people in the video segments. The predicted attributes may be used to predict how the people are likely to behave as a group and determine a group management actions to perform. Although described with respect to an amusement park, the model may be used to predict summary statistics at other locations such as a zoo, a museum, a convention, a fair, sports event, or a music festival where large crowds may gather.

For generating training datasets to be used for training the model, training video segments depicting various situations that occurred at amusement parks may be presented to human annotators via a user interface. As described above with respect to the airport example, annotators may be asked to identify groups of people in the training video segments or presented with training video segments with the groups of people already highlighted. The annotators are given instructions to answer questions regarding common attributes that they see in the groups. Examples of questions that the annotators are asked regarding a group of people may include "does the highlighted group of people intend to move to another part of the park," "does the highlighted group of people intend to wait in line for the ride/restaurant/show," and "does the highlighted group of people show awareness of an abnormal event." Summary statistics of user responses from the annotators may be determined by aggregating the user responses, and the summary statistics are used to create training datasets for training the model to predict attributes of mind of groups of people depicted in input video segments. The predicted attributes are used to determine a group management action to be performed for managing movement of the groups of people.

When the system captures new video segments of the amusement park and applies the trained model, the model predicts summary statistics that describe an attribute of a group of people in the new video segments. The predicted summary statistics is used to predict behavior in the group of people to determine how to dispatch trams. If there is a large group of people at a location having intention above a threshold to move to another part of the amusement park, additional trams or traffic control personnel may be dispatched to the location. The predicted summary statistics may also be used to determine whether to dispatch additional staff at a location. For example, if there is a large group of people with intention above a threshold to wait in line for an event, personnel may be sent to the location to manage the crowds. If there is a large group of people with intentions above a threshold to wait for a ride/restaurant/show, the system may make announcements to promote a different ride/restaurant/show that is less crowded to try to create a more even crowd distribution. The predicted summary statistics may also be used to detect abnormal situations for dispatching employees such as security personnel or cleaning personnel or dispatching autonomous robots. If there is a high likelihood of a group of people being aware of an event and reacting abnormally in response, the system determines that there is likely an abnormal event that require attention and dispatches personnel to the location of the event.

Traffic Monitoring System

At an intersection, a system including a plurality of cameras is used to monitor traffic. The plurality of cameras may be mounted onto traffic lights, street signs, buildings near the intersection and configured to capture video segments of pedestrians, motorists, and cyclists passing through the intersection. The video segments captured by the cameras are provided to a machine learning based model trained to predict summary statistics to determine how road users such as pedestrians, motorists, and cyclists are likely to behave at the intersection. Using the predicted behaviors, the system identifies common patterns in how road users behave and uses the common patterns to determine if actions should be taken to improve traffic management at the intersection. For example, the system may adjust traffic light timings based on predicted intent of pedestrians near the intersection. In an embodiment, the system makes recommendations for handling traffic conditions that repeatedly occur at traffic intersections, for example, recommendations to install additional traffic enforcement cameras, install traffic signs, add fences to prevent jaywalking, staff traffic enforcement officers, or implement other measures to improve traffic at the intersection.

Details on using a trained model to predict summary statistics of road users are described above with respect to FIGS. 1-10. In addition to using the summary statistics to control a vehicle, the summary statistics is used by the system for making recommendations concerning city planning. The system may apply the trained model to new video segments captured by cameras in an intersection and determine if there are patterns in intentions of road users to act in an unlawful or dangerous way. In some embodiments, the system may generate a report that includes aggregated summary statistics of road user behavior over a predetermined period of time and provide the report to city officials to be used for city planning. In other embodiments, the system may make recommendations on the group management action to take to improve the intersection. For example, if the summary statistics indicate that there is a large number of people that show intention above a threshold to jaywalk at a particular location, the system may recommend adjusting signal timings at the intersection or creating a physical barrier such as a fence or a warning sign. If the summary statistics indicate that there are many vehicles with intentions above a threshold to pass through an intersection but end up making a sudden stop, the system determines that the duration of the green light and/or the yellow light at the intersection is too short and recommend adjusting signal timing. If the summary statistics indicate that among road users showing intentions above a threshold to cross the intersection unlawfully, a subset of the road users that show high awareness of a traffic enforcement officer or camera decide not to cross the intersection unlawfully, the system recommends adding a sign nearby to remind road users of the camera or recommend staffing traffic enforcement officers more frequently at the intersection.

Store Monitoring System

In some embodiments, the machine learning models are used in stores for monitoring shoppers. A store is equipped with a system including a plurality of cameras used to monitor shoppers. The plurality of cameras may be installed overhead on walls or ceilings to monitor a wide area within the store, on displays where products are displayed, or at self-checkout stands. The video segments captured by the plurality of cameras may be inputted to a machine learning based model that predicts summary statistics describing a state of mind of shoppers depicted in the video segments. Based on the summary statistics, the system predicts shopper behaviors to detect malicious behavior by a shopper, for example, to determine whether a shopper is likely to leave the store without paying. In an embodiment, the system sends an alert, for example, to security personnel if the model predicts more than a threshold likelihood of a malicious behavior by a shopper.

To generate the training dataset used to train the model, training video segments on events that occur in stores may be presented to annotators and request that the annotators answer a set of questions about shoppers in the training video segments. Examples of questions that the annotators are asked to answer after viewing a training video segment may include "does the highlighted shopper have intention to shoplift," "did the highlighted shopper find the product they are looking for," and "does the highlighted shopper have interest in purchasing the product that they are holding." Summary statistics of user responses to the questions are used to generate training datasets for training the model.

When the system captures new video segments of the store and applies the trained model, the model predicts summary statistics describing a state of mind of shoppers in the new video segments. The model may be applied in real-time to analyze shopper behaviors as the shoppers are shopping and perform an action to prevent shoplifting. For example, if a shopper has intention above a threshold to try to steal an object, the system may send an alert to a security personnel with the image and location of the shopper to take appropriate action. The model may be used to determine a likelihood of the shopper finding the product they were looking for. If the likelihood of the shopper having found the product they were looking for is lower than a threshold, an alert is automatically sent to a member of staff identifying the location of the shopper to take appropriate action, for example, to send help or to determine if a shelf needs to be restocked. The summary statistics predicted by the model may be aggregated over a period of time and used to improve product placement or store layout.

Additional Considerations

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computer-implemented method for controlling a moveable device, the method comprising:
   receiving a plurality of training images, wherein each image from the plurality of training images displays one or more persons;
   for each of the plurality of training images:
      sending the training image to one or more annotators via a user interface requesting user responses describing a state of mind of a person displayed in the training image; and
      receiving user responses from the annotators, each user response describing the state of mind of the one or more persons displayed in the image;
   generating training dataset comprising, for each of the plurality of training images, summary statistics of user responses received for the training image;
   training, using the training dataset, a machine learning based model configured to receive an input image and predict summary statistics describing a state of mind of a person displayed in the input image;
   receiving a new image of a new environment, the new image including a new person;
   predicting, using the machine learning based model, summary statistics describing a state of mind of the new person in the new image; and
   controlling the moveable device based on the predicted summary statistics describing the state of mind of the new person.

2. The computer-implemented method of claim 1, wherein sending the plurality of training images to the annotators via the user interface, further comprises:
   selecting a set of questions to be presented to the annotators with the plurality of training images; and
   sending the set of questions and the plurality of training images for display to the annotators via the user interface.

3. The computer-implemented method of claim 2, wherein the set of questions are selected based on one or more of: features associated with the moveable device and features extracted a training image.

4. The computer-implemented method of claim 1, wherein the moveable device is a delivery robot and the state of mind predicted by the machine learning based model indicates a likelihood of the new person performing an action, the action including one of:
   interact with the delivery robot to load an object to be delivered,
   interact with the delivery robot to pick up an object delivered by the delivery robot, or
   move into a path of motion of the delivery robot.

5. The computer-implemented method of claim 4, wherein responsive to the likelihood of the new person interacting with the delivery robot to load the object or pick up the object being greater than a threshold, controlling the delivery robot to perform one or more of:
   requesting credentials from the new person,
   staying in place for the new person to approach,
   moving toward the new person, or
   opening a compartment configured to hold the object.

6. The computer-implemented method of claim 4, wherein responsive to the likelihood of the new person moving into the path of motion of the delivery robot, controlling the moveable device to perform one or more of:
   stopping in place until the new person has passed by the delivery robot,
   rerouting to move around the new person,
   sounding an alarm, or
   moving at a slower speed.

7. The computer-implemented method of claim 1, wherein the moveable device is a forklift or a factory arm and the state of mind predicted by the machine learning based model indicates a likelihood of the new person being aware of the moveable device.

8. The computer-implemented method of claim 7, wherein responsive to the likelihood of the new person being aware of the forklift or the factory arm being less than a threshold, controlling the forklift or the factory arm to perform one of:
   stop in place, or
   sound an alarm.

9. The computer-implemented method of claim 1, wherein the moveable device is a forklift or a factory arm and wherein the state of mind indicates a likelihood of the new person moving into a path of motion of the forklift or the factory arm.

10. The computer-implemented method of claim 8, wherein responsive to the likelihood of the new person moving into the path of motion of the moveable device being greater than a threshold, controlling the forklift or the factory arm to perform one of:
    stop in place, or
    sound an alarm.

11. The computer-implemented method of claim 1, wherein the moveable device is a drone and the state of mind predicted by the machine learning based model indicates a likelihood of the new person becoming aware of the drone.

12. The computer-implemented method of claim 11, wherein responsive to the likelihood of the new person becoming aware of the drone being greater than a threshold, controlling the drone to perform one or more of:
    sounding an alarm,
    flying to a higher altitude, or
    moving in a direction away from the new person.

13. The computer-implemented method of claim 11, wherein the moveable device is a drone and the state of mind predicted by the machine learning based model indicates a likelihood of the new person acting interacting with the drone.

14. The computer-implemented method of claim 13, wherein responsive to the likelihood of the new person interacting with the drone being greater than a threshold, controlling the drone to perform one or more of:
    sounding an alarm,
    flying to a higher altitude,
    moving in a direction away from the new person, or
    contacting a human operator.

15. The computer-implemented method of claim 1, wherein the moveable device is a robot configured to perform hospitality functions or security functions and the state of mind predicted by the machine learning based model indicates a likelihood of the new person performing an action, the action including one of:

interacting with the robot, or moving into a path of motion of the robot.

16. The computer-implemented method of claim 15, wherein responsive to the likelihood of the new person interacting with the robot exceeding a threshold, controlling the robot to move toward the new person and initiate an interaction.

17. The computer-implemented method of claim 15, wherein responsive to the likelihood of the new person interacting with the robot exceeding a threshold, controlling the robot to perform one or more of:

sounding an alarm, blocking the new person, or contacting security personnel.

18. The computer-implemented method of claim 15, wherein responsive to the likelihood of the new person moving into the path of motion of the robot, controlling the moveable device to perform one or more of:

stopping in place until the new person has passed by the robot, rerouting to move around the new person, sounding an alarm, or moving at a slower speed.

19. A non-transitory computer readable storage medium storing instructions that when executed by a computer processor cause the computer processor to perform steps of a computer-implemented method for controlling a moveable device, the steps comprising:

receiving a plurality of training images, wherein each image from the plurality of training images displays one or more persons;

for each of the plurality of training images:

sending the training image to one or more annotators via a user interface requesting user responses describing a state of mind of a person displayed in the training image; and receiving user responses from the annotators, each user response describing the state of mind of the one or more persons displayed in the image;

generating training dataset comprising, for each of the plurality of training images, summary statistics of user responses received for the training image;

training, using the training dataset, a machine learning based model configured to receive an input image and predict summary statistics describing a state of mind of a person displayed in the input image;

receiving a new image of a new environment, the new image including a new person;

predicting, using the machine learning based model, summary statistics describing a state of mind of the new person in the new image; and controlling the moveable device based on the predicted summary statistics describing the state of mind of the new person.

20. A computer system comprising:

a computer processor; and a non-transitory computer readable storage medium storing instructions that when executed by a computer processor cause the computer processor to perform steps of a computer-implemented method for determining an attribute of one or more persons, the steps comprising:

receiving a plurality of training images, wherein each image from the plurality of training images displays one or more persons;

for each of the plurality of training images:

sending the training image to one or more annotators via a user interface requesting user responses describing a state of mind of a person displayed in the training image; and receiving user responses from the annotators, each user response describing the state of mind of the one or more persons displayed in the image;

generating training dataset comprising, for each of the plurality of training images, summary statistics of user responses received for the training image;

training, using the training dataset, a machine learning based model configured to receive an input image and predict summary statistics describing a state of mind of a person displayed in the input image;

receiving a new image of a new environment, the new image including a new person;

predicting, using the machine learning based model, summary statistics describing a state of mind of the new person in the new image; and controlling a moveable device based on the predicted summary statistics describing the state of mind of the new person.

* * * * *